United States Patent
Flohr et al.

(10) Patent No.: US 11,810,290 B2
(45) Date of Patent: Nov. 7, 2023

(54) METHOD AND COMPUTER SYSTEM FOR GENERATING A COMBINED TISSUE-VESSEL REPRESENTATION

(71) Applicant: Siemens Healthcare GmbH, Erlangen (DE)

(72) Inventors: Thomas Flohr, Uehlfeld (DE); Bernhard Schmidt, Fuerth (DE); Grzegorz Soza, Heroldsberg (DE); Michael Suehling, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 42 days.

(21) Appl. No.: 16/710,151

(22) Filed: Dec. 11, 2019

(65) Prior Publication Data

US 2020/0202522 A1    Jun. 25, 2020

(30) Foreign Application Priority Data

Dec. 19, 2018    (EP) .................................. 18214023

(51) Int. Cl.
*G06T 7/00* (2017.01)

(52) U.S. Cl.
CPC .............. *G06T 7/0012* (2013.01); *G06T 7/97* (2017.01); *G06T 2207/20212* (2013.01); *G06T 2207/30048* (2013.01); *G06T 2207/30101* (2013.01)

(58) Field of Classification Search
CPC ..................... G06T 7/0012; G06T 7/97; G06T 2207/20212; G06T 2207/30048;
(Continued)

(56) References Cited

U.S. PATENT DOCUMENTS

| 9,786,068 B2* | 10/2017 | Ishii ...................... A61B 6/504 |
| 2002/0055680 A1* | 5/2002 | Miele ...................... A61B 8/04 |
| | | 600/450 |

(Continued)

FOREIGN PATENT DOCUMENTS

| CN | 1541617 A | 11/2004 |
| CN | 105096388 A | 11/2015 |

(Continued)

OTHER PUBLICATIONS

Termeer Maurice et al.: "Visualization of Myocardial Perfusion Derived from Coronary Anatomy", in: IEEE Transactions on Visualization and Computer Graphics, vol. 14, No. 6, pp. 1595-1602; 2008.

(Continued)

*Primary Examiner* — John Villecco
*Assistant Examiner* — Han Hoang
(74) *Attorney, Agent, or Firm* — Harness, Dickey & Pierce, P.L.C.

(57) ABSTRACT

An embodiment relates to a computer-implemented method for generating a combined tissue-vessel representation. The method includes receiving imaging data of a tissue; receiving imaging data of a vessel; generating a tissue representation based on the imaging data of the tissue; generating a vessel representation based on the imaging data of the vessel; and generating a combined tissue-vessel representation based on the vessel representation and the tissue representation, the vessel representation being overlaid over the tissue representation.

31 Claims, 8 Drawing Sheets

(58) Field of Classification Search
CPC ......... G06T 2207/30101; G06T 11/206; G06T 17/00; G06T 2210/41; A61B 6/032; A61B 6/504; A61B 6/503
See application file for complete search history.

(56) References Cited

U.S. PATENT DOCUMENTS

| | | |
|---|---|---|
| 2004/0087853 A1 | 5/2004 | Fujisawa |
| 2005/0043614 A1 | 2/2005 | Huizenga et al. |
| 2005/0084073 A1* | 4/2005 | Seppi ............... A61B 6/405 378/156 |
| 2008/0275336 A1* | 11/2008 | Deschamps ......... A61B 6/032 600/425 |
| 2011/0007953 A1 | 1/2011 | Bernhardt et al. |
| 2011/0141102 A1* | 6/2011 | Skinner ............... G06T 19/00 345/419 |
| 2011/0218427 A1* | 9/2011 | Kitamura ........... A61B 6/5217 600/425 |
| 2012/0041739 A1 | 2/2012 | Taylor |
| 2012/0243764 A1 | 9/2012 | Dey et al. |
| 2016/0335763 A1 | 11/2016 | Ambwani et al. |
| 2017/0046839 A1 | 2/2017 | Paik et al. |
| 2018/0218794 A1 | 8/2018 | Hoelzer et al. |
| 2018/0344262 A1* | 12/2018 | Oka .................... A61B 5/0095 |
| 2018/0357767 A1 | 12/2018 | Arakita et al. |
| 2018/0365838 A1 | 12/2018 | Lorenz et al. |
| 2019/0236763 A1* | 8/2019 | Chan .................. A61B 6/032 |
| 2020/0015758 A1 | 1/2020 | Sharma et al. |
| 2020/0113450 A1* | 4/2020 | Nishioka ........... A61B 5/02028 |

FOREIGN PATENT DOCUMENTS

| | | |
|---|---|---|
| CN | 106056126 A | 10/2016 |
| CN | 107787201 A | 3/2018 |
| CN | 108403092 A | 8/2018 |
| CN | 108475428 A | 8/2018 |
| EP | 2538361 A2 | 12/2012 |
| WO | WO 2009031081 A2 | 3/2009 |
| WO | WO 2010020933 A2 | 2/2010 |
| WO | WO 2010061335 A1 | 6/2010 |
| WO | WO 2015032647 A1 | 3/2015 |

OTHER PUBLICATIONS

Extended European Search Report for Application No. 18214023.6 dated Apr. 5, 2019.

* cited by examiner

METHOD AND COMPUTER SYSTEM FOR GENERATING A COMBINED TISSUE-VESSEL REPRESENTATION

PRIORITY STATEMENT

The present application hereby claims priority under 35 U.S.C. § 119 to European patent application number EP 18214023.6 filed Dec. 19, 2018, the entire contents of which are hereby incorporated herein by reference.

FIELD

Embodiments of the invention generally relate a computer-implemented method for generating a combined tissue-vessel representation; and a computer system for generating a combined tissue-vessel representation.

BACKGROUND

Coronary computed tomography angiography (CTA) is the modality of choice to detect coronary artery disease. Many coronary CTA examinations reveal intermediate coronary artery stenosis. Functional assessment of these lesions is critical for meaningful clinical decision making.

CTA-based fractional flow reserve (CT-FFR) is one of modern techniques using advanced computational models (based on fluid dynamics simulation and/or machine learning) for estimation of hemodynamic relevance of coronary stenosis. Other techniques to determine the hemodynamic relevance of a stenosis are based on evaluation of the left and/or right ventricular function of the heart, including first and late pass enhancement calculation. Furthermore, dynamic myocardial perfusion technique allows calculation of functional maps of the heart (e.g. the myocardial blood flow and volume) and enables quantitative assessment of the hemodynamic relevance of intermediate stenosis of the coronaries. With Dual Energy CT technique, it is possible to visualize iodine concentration in the myocardium, thus helping to reveal perfusion defects and assess relevance of stenosis.

Analyzing this clinical data is time-consuming and requires manual work of radiologists to bring this information together into one mental picture of the patient. Therefore, an appropriate visualization integrating information coming from different sources and establishing correspondence between the affected areas of the coronaries and the affected areas of the heart is of high interest in order to support the radiologist at diagnosis.

SUMMARY

At least one embodiment of the invention facilitates an improved visualization of vessel-related information with respect to tissue-related information. The claims are related to further aspects of the invention.

In one embodiment, the invention relates to a method, particularly a computer-implemented method, for generating a combined tissue-vessel representation, comprising:
   receiving imaging data of a tissue;
   receiving imaging data of a vessel;
   generating a tissue representation based on the imaging data of the tissue;
   generating a vessel representation based on the imaging data of the vessel; and
   generating a combined tissue-vessel representation based on the vessel representation and the tissue representation, wherein the vessel representation is overlaid over the tissue representation.

In one further embodiment, the invention relates to a computer system for generating a combined tissue-vessel representation, comprising:
   a tissue imaging data receiver for receiving imaging data of a tissue,
   a vessel imaging data receiver for receiving imaging data of a vessel,
   a tissue representation generator for generating a tissue representation based on the imaging data of the tissue,
   a vessel representation generator for generating a vessel representation based on the imaging data of the vessel, and
   a tissue-vessel representation generator for generating a combined tissue-vessel representation based on the vessel representation and the tissue representation, wherein the vessel representation is overlaid over the tissue representation.

In another embodiment, the computer system is configured to implement the method according to one or more of the disclosed embodiments.

In one further embodiment, the invention relates to a computer program product comprising program elements which induce a computer system to carry out the steps of the method according to one or more of the disclosed embodiments, when the program elements are loaded into a memory of the computer system.

In one further embodiment, the invention relates to a computer-readable medium on which program elements are stored that can be read and executed by a computer system, in order to perform the steps of the method according to one or more of the disclosed embodiments, when the program elements are executed by the computer system.

BRIEF DESCRIPTION OF THE DRAWINGS

The invention will be illustrated below with reference to the accompanying figures using example embodiments. The illustration in the figures is schematic and highly simplified and not necessarily to scale.

DETAILED DESCRIPTION OF THE EXAMPLE EMBODIMENTS

Figure 1:
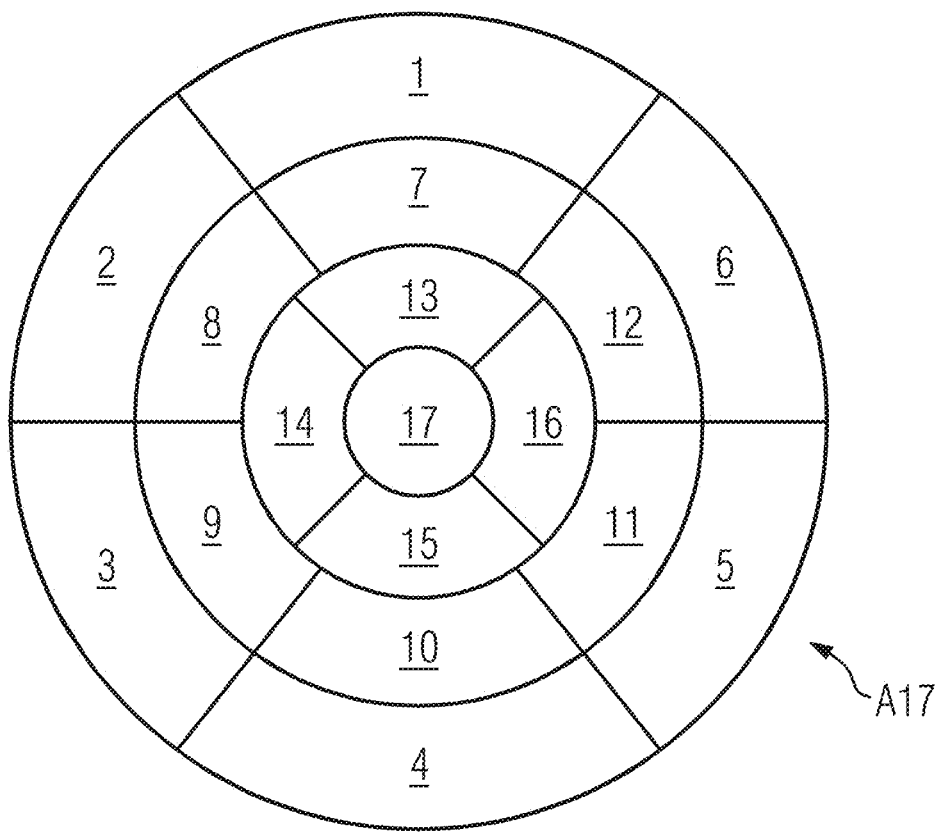
FIG. 1 shows an arrangement of segments according to the AHA-17 segment model.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Nonlimiting examples of the non-transitory computer-readable medium include, but are not limited to, rewriteable nonvolatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable nonvolatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In one embodiment, the invention relates to a method, particularly a computer-implemented method, for generating a combined tissue-vessel representation, comprising:
receiving imaging data of a tissue;
receiving imaging data of a vessel;
generating a tissue representation based on the imaging data of the tissue;
generating a vessel representation based on the imaging data of the vessel; and
generating a combined tissue-vessel representation based on the vessel representation and the tissue representation, wherein the vessel representation is overlaid over the tissue representation.

The combined tissue-vessel representation may comprise the tissue representation as a background image and the vessel representation as a foreground image. In particular, the vessel representation may be overlaid over a portion of the tissue representation that represents the portion of the tissue that is closest to the vessel. The generating the combined tissue-vessel representation based on the vessel representation and the tissue representation may comprise registering the vessel representation with respect to the tissue representation based on the imaging data of the tissue and the imaging data of the vessel.

The imaging data may be multidimensional. In particular, the imaging data may comprise, for example, two or three dimensions for position information, one dimension for quantitative information indicative of a value of a parameter of the vessel or tissue, and one time dimension for temporal information.

In another embodiment, the vessel representation comprises a centerline of the vessel. In another embodiment the vessel representation comprises a representation of a wall of the vessel. In another embodiment the vessel representation comprises a representation of an inner wall of the vessel and/or a representation of an outer wall of the vessel.

The vessel representation may comprise a vessel-subset representation of a subset of the vessel. The vessel representation may comprise a plurality of vessel-subset representations of subsets of the vessel. The vessel-subset representation and/or the vessel-subset representations may be obtained by segmenting the vessel based on the imaging data. Exemplary vessel-subset representations are a centerline of the vessel, a representation of an inner wall of the vessel and a representation of an outer wall of the vessel. The representation of the inner wall of the vessel may correspond to a lumen of the vessel.

In another embodiment, the vessel representation comprises, for each position of a plurality of positions along the vessel, color-encoded quantitative information indicative of a value of a parameter of the vessel at that position. The plurality of positions may be distributed along the vessel, particularly distributed one-dimensionally along the vessel. The color-encoding of the quantitative information may be based on a color scale, particularly a multicolor scale, relating colors to values. The multicolor scale may comprise, for example, the colors red, yellow, green and blue, and/or a color continuum.

In another embodiment, the parameter of the vessel is a geometrical parameter, particularly a lumen diameter or a wall thickness. The lumen diameter may correspond to the diameter of the inner wall of the vessel. The wall thickness may correspond to a difference between the diameter of the outer wall of the vessel and the diameter of the inner wall of the vessel.

In another embodiment, the parameter of the vessel is an x-ray attenuation parameter, particularly a HU (Hounsfield) value or a HU gradient.

In another embodiment, the parameter of the vessel is a hemodynamic parameter, particularly fractional flow reserve, blood pressure, blood velocity, another blood flow parameter, wall stress, wall tension or strain. The quantitative information may be obtained by calculating values of the parameter of the vessel based on the imaging data, for example, using numerical simulation, particularly fluid simulation, and/or a machine learning algorithm.

In another embodiment, the vessel representation comprises a local feature of the vessel, particularly color-encoded quantitative information indicative of a plaque or a plaque composition. In particular, the parameter of the vessel may be a plaque parameter, particularly a plaque density, a plaque type or a proportion of one or more plaque components in the total plaque volume. Plaque types may be, for example, calcified plaque, non-calcified plaque and mixed plaque. Plaque components may be, for example, fibrous tissue, fibro-fatty (fibro-lipid) tissue, cholesterol, necrotic core, and dense calcium.

In another embodiment, the tissue representation comprises, for each position of a plurality of positions across the tissue, color-encoded quantitative information indicative of a value of a parameter of the tissue at that position. The plurality of positions may be distributed across the tissue, particularly distributed two-dimensionally across the tissue.

In another embodiment, the parameter of the tissue is a geometrical parameter, particularly a thickness, a thickening or a motion. The geometrical parameter of the tissue may be a ventricle wall thickness, a ventricle wall thickening or a ventricle wall motion.

In another embodiment, the parameter of the tissue is a functional parameter, particularly a contrast medium concentration, a blood flow or a blood volume. The contrast medium concentration may be iodine concentration. The blood flow may be a myocardial blood flow. The blood volume may be a myocardial blood volume. The tissue representation comprising for each position of a plurality of positions across the tissue, color-encoded quantitative information indicative of a value of a parameter of the tissue at that position may be a functional image, particularly a perfusion map.

In another embodiment, the tissue representation comprises a planar polar plot of the tissue and/or the vessel representation comprises a projection of the vessel onto a reference plane. The reference plane may be in-plane with the planar polar plot of the tissue.

The planar polar plot of the tissue may be obtained by projecting the tissue onto a plane based on the imaging data of the tissue and a segment model of the tissue, for example the AHA-17 segment model of the left ventricle of the heart. The AHA-17 segment model has been established by the American Heart Association (AHA) and defines 17 segments of the left ventricle of the human heart. A planar polar plot obtained by projecting the tissue of the left ventricle onto a plane based on the imaging data of the tissue and the AHA-17 segment model will be referred to as AHA-17 plot.

Coronary arteries may be projected onto a reference plane using a parameterization of the left ventricle based on a cylindrical coordinate system, using the cardiac long axis as the cylindrical axis. The reference plane is perpendicular to the cylindrical axis and in-plane with the planar polar plot.

In another embodiment, the tissue representation comprises a rendered image of the tissue and/or the vessel representation comprises a rendered image of the vessel. The rendered image of the tissue may be obtained by rendering, particularly 3D surface rendering or 3D volume rendering, based on the imaging data of the tissue.

In another embodiment, the tissue is heart tissue, particularly tissue of the left ventricle of the heart, and/or the vessel is a coronary artery, particularly a coronary artery supplying the left ventricle of the heart. The heart tissue may be tissue of the left ventricle of the heart, tissue of the right ventricle of the heart, tissue of the left chamber of the heart, tissue of the right chamber of the heart or a combination thereof. The method may be applied to anatomical structures other than heart, for example to brain, liver or lung.

In one further embodiment, the invention relates to a computer system for generating a combined tissue-vessel representation, comprising:
a tissue imaging data receiver for receiving imaging data of a tissue,
a vessel imaging data receiver for receiving imaging data of a vessel,
a tissue representation generator for generating a tissue representation based on the imaging data of the tissue,
a vessel representation generator for generating a vessel representation based on the imaging data of the vessel, and
a tissue-vessel representation generator for generating a combined tissue-vessel representation based on the vessel representation and the tissue representation, wherein the vessel representation is overlaid over the tissue representation.

In another embodiment, the computer system is configured to implement the method according to one or more of the disclosed embodiments.

In one further embodiment, the invention relates to a computer program product comprising program elements which induce a computer system to carry out the steps of the method according to one or more of the disclosed embodiments, when the program elements are loaded into a memory of the computer system.

In one further embodiment, the invention relates to a computer-readable medium on which program elements are stored that can be read and executed by a computer system, in order to perform the steps of the method according to one or more of the disclosed embodiments, when the program elements are executed by the computer system.

The combined tissue-vessel representation facilitates a combined visualization which integrates quantitative information about the coronary arteries with the quantitative information about the heart. In particular, the proposed solution provides comprehensive visualization of quantitative information regarding coronary arteries, particularly about stenosis within coronary arteries, together with quantitative information regarding the physiology of the left ventricle.

Such an integrated view can help the radiologist to establish correspondence between the vessel, particularly a coronary artery, and the tissue, particularly a portion of the tissue supplied by that coronary artery. This can help to better correlate the location of infarcted or ischemic areas in heart tissue to the location in the coronaries that have caused the respective infarction or ischemia, thus contributing to an easier and less error-prone diagnostic process.

Any of the algorithms mentioned herein may be based on one or more of the following architectures: convolutional neural networks, deep belief networks, deep residual learning, deep reinforcement learning, recurrent neural networks, Siamese networks, generative adversarial networks or autoencoders. In particular, the trained machine learning algorithm for determining the fat distribution information may be embodied as a deep learning algorithm and/or as a convolutional neural network.

Any of the computer system components mentioned herein or any interface between the computer system components may be embodied in form of hardware and/or software. In particular, an interface may be embodied in form of at least one of a PCI-Bus, a USB or a Firewire. In particular, a computer system component may comprise hardware elements and/or software elements, for example a microprocessor, a field programmable gate array (an acronym is "FPGA") or an application specific integrated circuit (an acronym is "ASIC").

The computer system may, for example, comprise and/or be a part of at least one of a cloud-computing system, a distributed computing system, a computer network, a computer, a tablet computer, a smartphone or the like. The computer system may comprise hardware and/or software. The hardware may be, for example, a processor system, a memory system and combinations thereof. The hardware may be configurable by the software and/or be operable by the software. Calculations for performing steps of a method and/or for training an algorithm may be carried out in a processor.

Data, particularly the imaging data of the tissue and/or the imaging data of the vessel, may be received, for example, by receiving a signal that carries the data and/or by reading the data from a computer-readable medium. Data, in particular, the combined tissue-vessel representation, may be provided, for example, by transmitting a signal that carries the data and/or by writing the data into a computer-readable medium and/or by displaying the data, for example in form of an image, on a display.

The computer program product may be, for example, a computer program or comprise another element apart from the computer program. This other element may be hardware, for example a memory device, on which the computer program is stored, a hardware key for using the computer program and the like, and/or software, for example, documentation or a software key for using the computer program. A computer-readable medium may be embodied as non-permanent main memory (e.g. random access memory) or as permanent mass storage (e.g. hard disk, USB stick, SD card, solid state disk).

A computer-readable medium on which program elements are stored that can be read and executed by an imaging data processing unit in order to perform the steps of the method according to one or more of the disclosed embodiments, when the program elements are executed by the imaging data processing unit.

Wherever not already described explicitly, individual embodiments, or their individual aspects and features, can be combined or exchanged with one another without limiting or widening the scope of the described invention, whenever such a combination or exchange is meaningful and in the sense of this invention. Advantages which are described with respect to one embodiment of the present invention are, wherever applicable, also advantageous of other embodiments of the present invention.

Reference is made to the fact that the described methods and the described system are merely preferred example embodiments of the invention and that the invention can be varied by a person skilled in the art, without departing from the scope of the invention as it is specified by the claims.

FIG. 1 shows an arrangement A17 of segments according to the AHA-17 segment model of the left ventricle. The numbers shown within the segments are used for identifying the segments.

Figure 2:
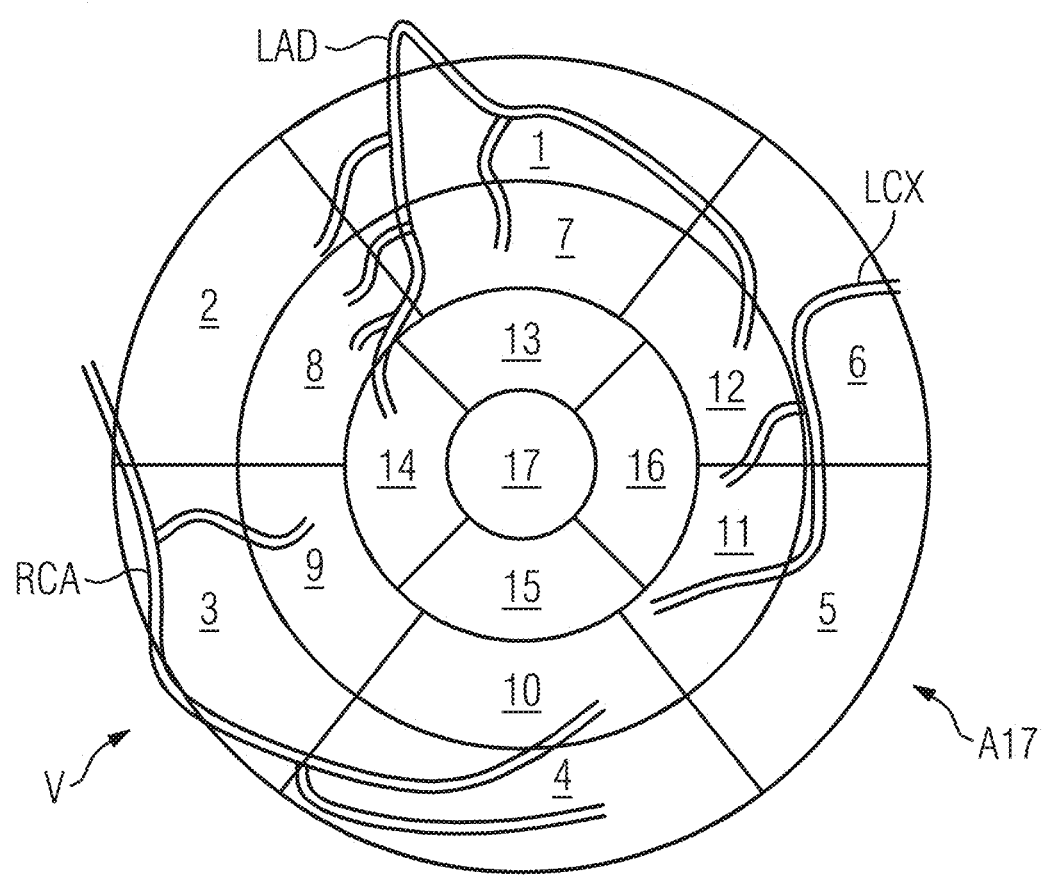
FIG. 2 shows a representation of coronary arteries overlaid over the arrangement of segments according to the AHA-17 segment model.

FIG. 2 shows a representation of coronary arteries overlaid over the arrangement A17 of segments according to the AHA-17 segment model. The representation of coronary arteries comprises a representation LAD of the left anterior descending artery, a representation RCA of the right coronary artery, and a representation LCX of the left circumflex artery. The vessel representation V comprises a representation of a wall of the vessel.

The segments 1, 2, 7, 8, 13, 14 and 17 may be assigned to the left anterior descending artery. The segments 3, 4, 9, 10 and 15 may be assigned to the right coronary artery. The segments 5, 6, 11, 12 and 16 may be assigned to the left circumflex artery.

Figure 3:
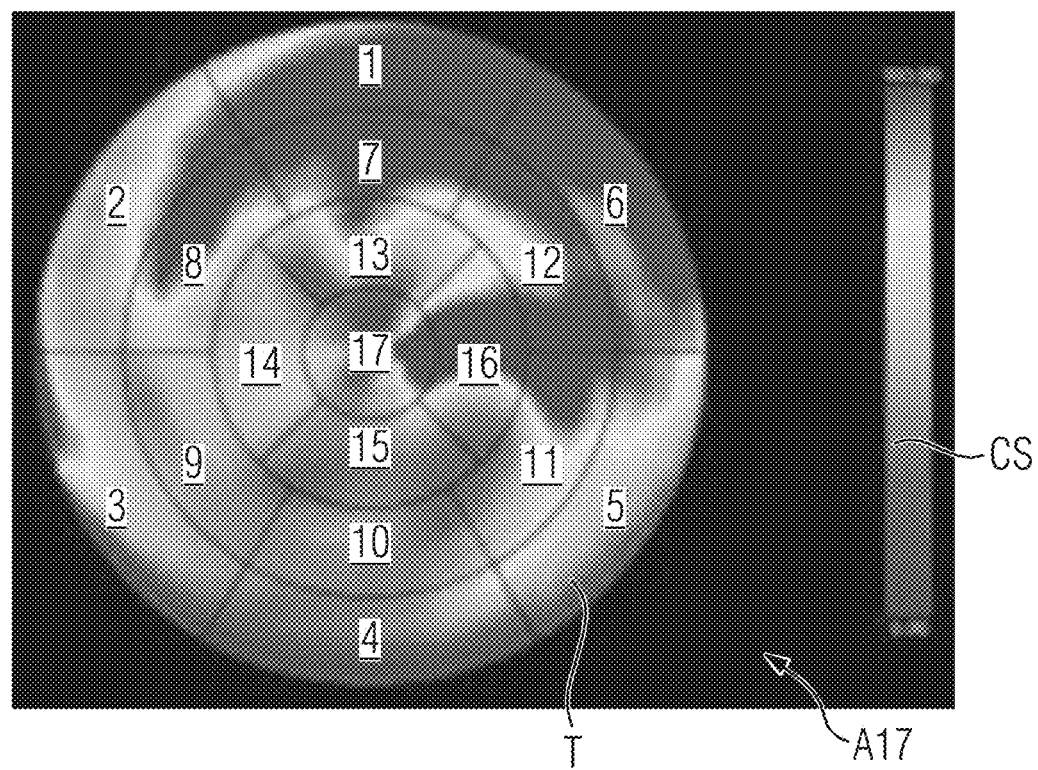
FIG. 3 shows an AHA-17 plot comprising color-encoded quantitative information.

FIG. 3 shows an AHA-17 plot comprising color-encoded quantitative information. A representation of the left ventricle comprising color-encoded quantitative information regarding a functional parameter is overlaid over the arrangement of segments according to the AHA-17 segment model. FIG. 3 further shows a color scale CS relating colors to values.

Figure 4:
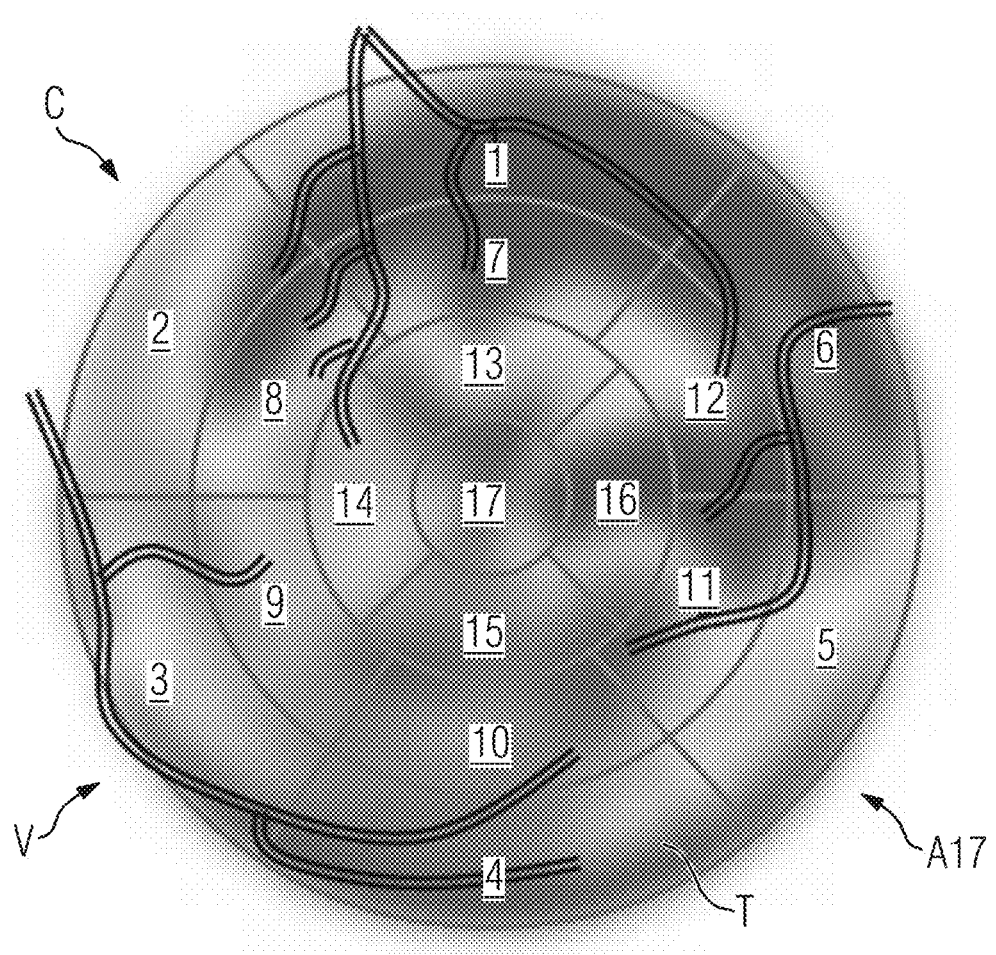
FIG. 4 shows a combined tissue-vessel representation, wherein a representation of coronary arteries is overlaid over the AHA-17 plot.

FIG. 4 shows a combined tissue-vessel representation C, wherein a representation of coronary arteries is overlaid over the AHA-17 plot. The tissue is heart tissue, particularly tissue of the left ventricle of the heart. The vessel is a coronary artery, particularly a coronary artery supplying the left ventricle of the heart. The tissue representation T comprises a planar polar plot of the tissue and the vessel representation V comprises a projection of the vessel onto a reference plane, the reference plane being in-plane with the planar polar plot of the tissue.

The combined tissue-vessel representation C comprises the representation of the left ventricle as a background image and the representation of the coronary arteries as a foreground image. The tissue representation T comprises, for each position of a plurality of positions across the tissue, color-encoded quantitative information indicative of a value of a parameter of the tissue at that position. The parameter of the tissue is a functional parameter, particularly a contrast medium concentration, a blood flow or a blood volume.

Figure 5:
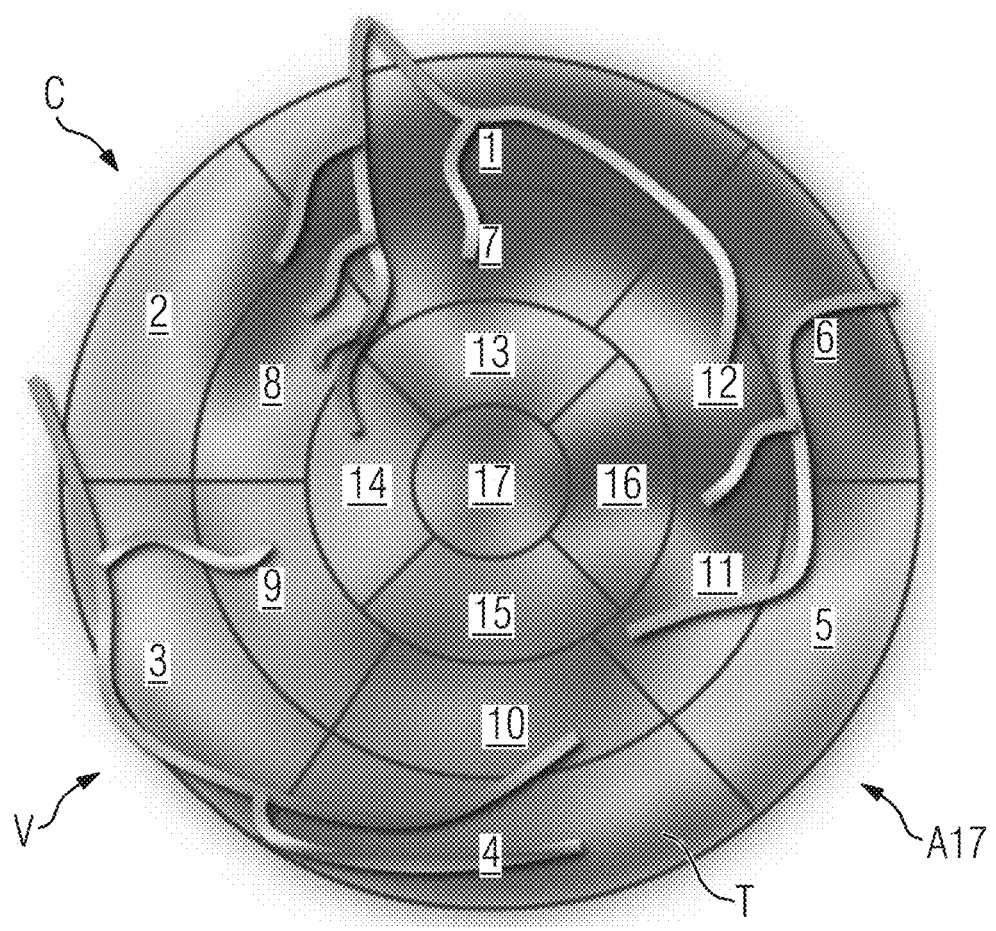
FIG. 5 shows another combined tissue-vessel representation, wherein a representation of coronary arteries is overlaid over the AHA-17 plot.

FIG. 5 shows another combined tissue-vessel representation C, wherein a representation of coronary arteries is overlaid over the AHA-17 plot. In form of the combined tissue-vessel representation C shown in FIG. 5, a functional image of the heart is combined with a functional image of the coronary arteries into one image. The vessel representation V comprises, for each position of a plurality of positions along the vessel, color-encoded quantitative information indicative of a value of a parameter of the vessel at that position. The parameter of the vessel is a hemodynamic parameter, particularly a fractional flow reserve. Each color is associated with a given fractional flow reserve (FFR) value.

Figure 6:
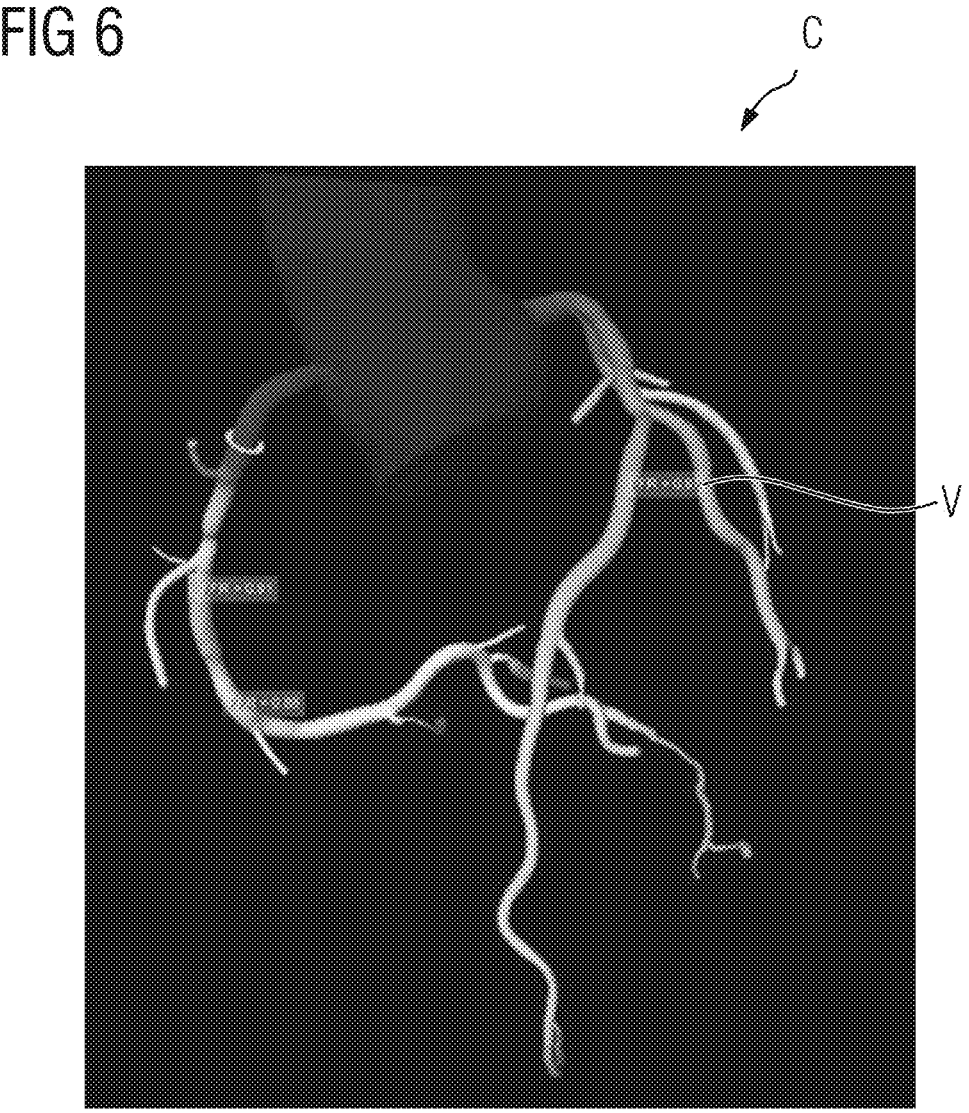
FIG. 6 shows a rendered image of coronary arteries comprising color-encoded quantitative information.

FIG. 6 shows a rendered image of coronary arteries comprising color-encoded quantitative information indicative of a fractional flow reserve (FFR).

Figure 7:
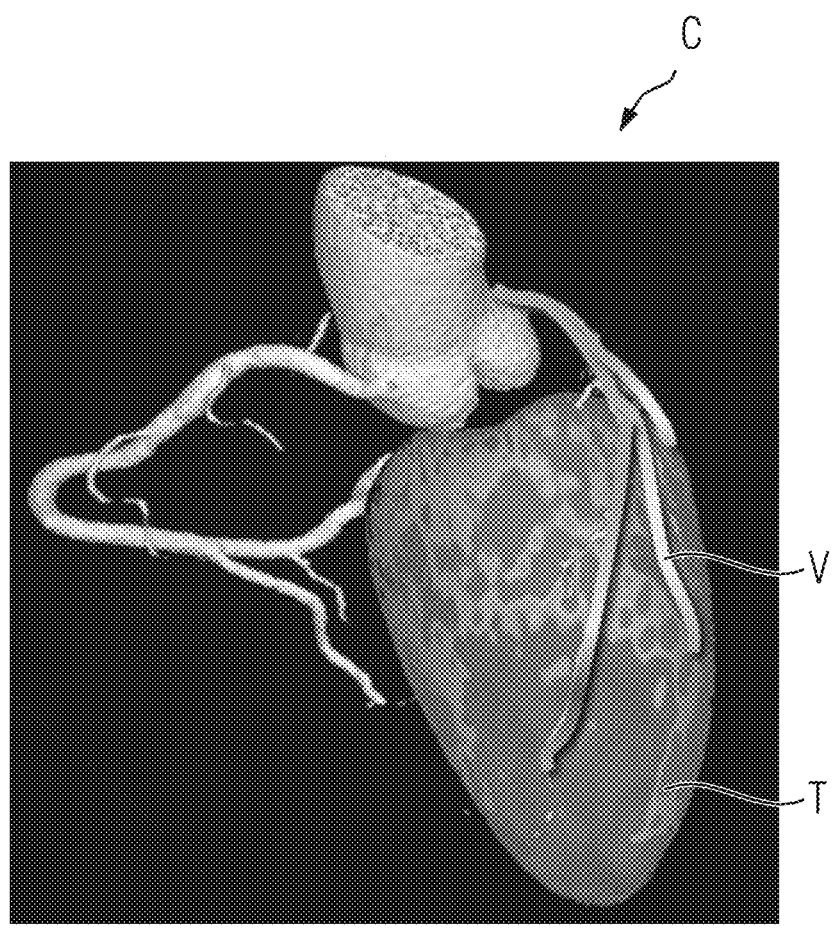
FIG. 7 shows a combined tissue-vessel representation, wherein a rendered image of coronary arteries is overlaid over a rendered image of the left ventricle.

FIG. 7 shows a combined tissue-vessel representation C, wherein a rendered image of coronary arteries is overlaid over a rendered image of the left ventricle. The tissue representation T comprises a rendered image of the tissue and the vessel representation V comprises a rendered image of the vessel. The combined tissue-vessel representation C comprises a 3D surface-rendered image of the left ventricle as a background image and a volume-rendered image of the coronary arteries as a foreground image.

In form of the combined tissue-vessel representation C shown in FIG. 7, a functional image of the heart is combined with a functional image of the coronary arteries into one image. The representation of the left ventricle comprises color-encoded quantitative information regarding blood flow, particularly a perfusion blood flow map. The representation of the coronary arteries comprises, at least for one of the coronary arteries, color-encoded quantitative information regarding fractional flow reserve. Another coronary artery is shown without color-encoded quantitative information.

Figure 8:
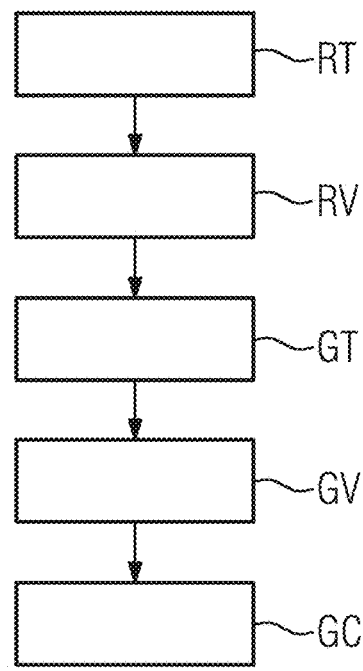
FIG. 8 shows a diagram illustrating a computer-implemented method for generating a combined tissue-vessel representation.

FIG. 8 shows a diagram illustrating a computer-implemented method for generating a combined tissue-vessel representation C, comprising:
Receiving RT imaging data of a tissue,
Receiving RV imaging data of a vessel,
Generating GT a tissue representation T based on the imaging data of the tissue,
Generating GV a vessel representation V based on the imaging data of the vessel, and
Generating GC a combined tissue-vessel representation C based on the vessel representation V and the tissue representation T, wherein the vessel representation V is overlaid over the tissue representation T.

Figure 9:
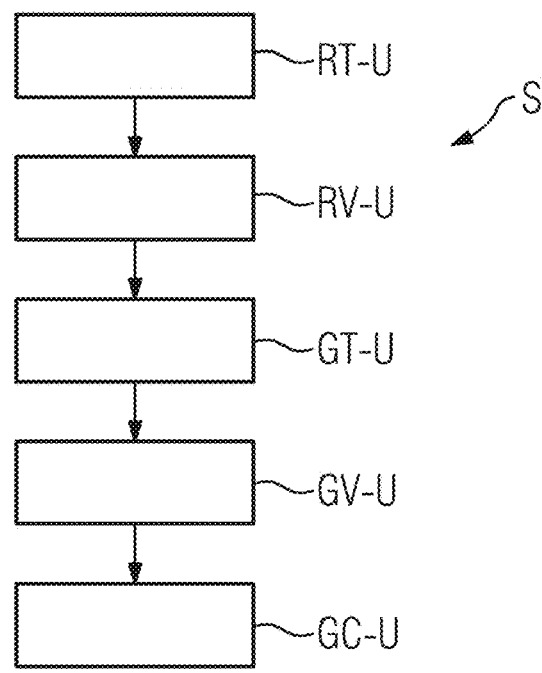
FIG. 9 shows a computer system for generating a combined tissue-vessel representation.

FIG. 9 shows a computer system S for generating a combined tissue-vessel representation C, comprising:
a tissue imaging data receiver RT-U for receiving RT imaging data of a tissue,
a vessel imaging data receiver RV-U for receiving RV imaging data of a vessel,
a tissue representation generator GT-U for generating GT a tissue representation T based on the imaging data of the tissue,
a vessel representation generator GV-U for generating GV a vessel representation V based on the imaging data of the vessel, and
a tissue-vessel representation generator GC-U for generating GC a combined tissue-vessel representation C based on the vessel representation V and the tissue representation T, wherein the vessel representation V is overlaid over the tissue representation T.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method performed by a computer system for generating a combined tissue-vessel representation, comprising:
generating a tissue representation based on imaging data of a tissue, the tissue representation including a planar polar plot of the tissue;
generating a vessel representation based on imaging data of a vessel, each of the tissue representation and the vessel representation including color-encoded quantitative information, the color-encoded quantitative information of the tissue representation color-encoding a plurality of values indicating a ventricle wall thickening of the tissue, the plurality of values indicating the ventricle wall thickening corresponding to respective first positions across the tissue, and the color-encoded quantitative information of the vessel representation color-encoding a value indicating a plaque composition of the vessel;
generating a combined tissue-vessel representation in which the vessel representation is overlaid over the tissue representation, the vessel representation including a projection of the vessel onto a reference plane, and the reference plane being in-plane with the planar polar plot of the tissue; and
displaying the combined tissue-vessel representation.

2. The computer-implemented method of claim 1, wherein the vessel representation includes a centerline of the vessel.

3. The computer-implemented method of claim 1, wherein the vessel representation includes at least one of an inner wall of the vessel or an outer wall of the vessel.

4. The computer-implemented method of claim 1, wherein the vessel representation includes the color-encoded quantitative information for each respective second position among a plurality of second positions along the vessel, the color-encoded quantitative information of the vessel representation color-encoding the value indicating the plaque composition of the vessel at the respective second position.

5. The computer-implemented method of claim 4, wherein the plaque composition is a proportion of one or more plaque components in a total plaque volume.

6. The computer-implemented method of claim 5, wherein the one or more plaque components include at least one of a fibrous tissue, a fibro-lipid tissue, cholesterol, necrotic core or dense calcium.

7. The computer-implemented method of claim 1, wherein
the tissue representation includes a rendered image of the tissue; and
the vessel representation includes a rendered image of the vessel.

8. The computer-implemented method of claim 1, wherein
the tissue is heart tissue; and
the vessel is a coronary artery.

9. The computer-implemented method of claim 8, wherein
the heart tissue is tissue of a left ventricle of the heart; and
the coronary artery supplies the left ventricle of the heart.

10. A non-transitory computer program product storing program elements that, when loaded into a memory an executed by a computer system, cause the computer system to carry out the method of claim 1.

11. A non-transitory computer-readable medium storing program elements that, when executed by a computer system, cause the computer system to perform the method of claim 1.

12. The computer-implemented method of claim 1, wherein the generating the combined tissue-vessel representation comprises registering the vessel representation with the tissue representation.

13. The computer-implemented method of claim 1, wherein the imaging data of the tissue or the imaging data of the vessel is dual energy computed tomography imaging data.

14. The computer-implemented method of claim 1, wherein
the tissue is heart tissue; and
the reference plane is perpendicular to a cardiac long axis of the heart tissue.

15. The computer-implemented method of claim 1, wherein the planar polar plot is obtained by projecting the tissue onto a plane based on the imaging data of the tissue and a segment model of the tissue.

16. The computer-implemented method of claim 1, wherein
the value indicating the plaque composition of the vessel is a first value indicating the plaque composition of the vessel;
the first value indicating the plaque composition of the vessel being color-encoded into a different color than a second value indicating the plaque composition of the vessel, the second value indicating the plaque composition of the vessel being different from the first value indicating the plaque composition of the vessel, and the first value indicating the plaque composition of the vessel and the second value indicating the plaque composition of the vessel being at different second positions along the vessel; and
a first value among the plurality of values being color-encoded into a different color than a second value among the plurality of values, the second value among the plurality of values being different from the first value among the plurality of values, and the plurality of values being at different first positions across the tissue.

17. The computer-implemented method of claim 16, wherein the first value indicating the plaque composition of the vessel and the second value indicating the plaque composition of the vessel are at different second positions distributed one-dimensionally along the vessel.

18. The computer-implemented method of claim 16, wherein the first value among the plurality of values and the second value among the plurality of values are at different first positions distributed two-dimensionally across the tissue.

19. The computer-implemented method of claim 1, wherein the plaque composition is a proportion of one or more plaque components in a total plaque volume.

20. The computer-implemented method of claim 19, wherein the one or more plaque components include at least one of a fibrous tissue, a fibro-lipid tissue, cholesterol, necrotic core or dense calcium.

21. A computer system for generating a combined tissue-vessel representation, comprising:
processing circuitry configured to cause the computer system to,
generate a tissue representation based on imaging data of a tissue, the tissue representation including a planar polar plot of the tissue,
generate a vessel representation based on imaging data of a vessel, each of the tissue representation and the vessel representation including color-encoded quantitative information, the color-encoded quantitative information of the tissue representation color-encoding a plurality of values indicating a ventricle wall thickening of the tissue, the plurality of values indicating the ventricle wall thickening corresponding to respective first positions across the tissue, and the color-encoded quantitative information of the vessel representation color-encoding a value indicating a plaque composition of the vessel,
generate a combined tissue-vessel representation in which the vessel representation is overlaid over the tissue representation, the vessel representation including a projection of the vessel onto a reference plane, and the reference plane being in-plane with the planar polar plot of the tissue, and
display the combined tissue-vessel representation.

22. The computer system of claim 21, wherein the plaque composition is a proportion of one or more plaque components in a total plaque volume.

23. The computer system of claim 22, wherein the one or more plaque components include at least one of a fibrous tissue, a fibro-lipid tissue, cholesterol, necrotic core or dense calcium.

24. The computer system of claim 21, wherein the vessel representation includes the color-encoded quantitative information for each respective second position among a plurality of second positions along the vessel, the color-encoded quantitative information of the vessel representation color-encoding the value indicating the plaque composition of the vessel at the respective second position.

25. The computer system of claim 24, wherein the plaque composition is a proportion of one or more plaque components in a total plaque volume.

26. The computer system of claim 25, wherein the one or more plaque components include at least one of a fibrous tissue, a fibro-lipid tissue, cholesterol, necrotic core or dense calcium.

27. A computer-implemented method for generating a combined tissue-vessel representation, comprising:
receiving imaging data of a tissue;
receiving imaging data of a vessel;
generating a tissue representation based on the imaging data of the tissue, the tissue representation including a planar polar plot of the tissue;
generating a vessel representation based on the imaging data of the vessel, the vessel representation including a projection of the vessel onto a reference plane, the reference plane being in-plane with the planar polar plot of the tissue; and
generating a combined tissue-vessel representation based on the vessel representation and the tissue representation, the vessel representation being overlaid on the tissue representation,
wherein
the vessel representation includes a local feature of the vessel, the local feature of the vessel being color-encoded quantitative information indicative of a plaque composition,
the tissue representation includes color-encoded quantitative information for each respective first position among a plurality of first positions across the tissue, the color-encoded quantitative information of the tissue representation being indicative of a value of a geometrical parameter of the tissue at the respective first position, and the geometrical parameter of the tissue being a ventricle wall thickening.

28. The computer-implemented method of claim 27, wherein the vessel representation includes the color-encoded quantitative information for each respective second position among a plurality of second positions along the vessel, the color-encoded quantitative information of the vessel representation color-encoding the value indicating the plaque composition of the vessel at the respective second position.

29. The computer-implemented method of claim 28, wherein the plaque composition is a proportion of one or more plaque components in a total plaque volume.

30. The computer-implemented method of claim 29, wherein the one or more plaque components include at least one of a fibrous tissue, a fibro-lipid tissue, cholesterol, necrotic core or dense calcium.

31. The computer-implemented method of claim 27, wherein
the tissue is heart tissue; and
the vessel is a coronary artery.

* * * * *